United States Patent
Mandeville

(10) Patent No.: US 10,134,052 B2
(45) Date of Patent: Nov. 20, 2018

(54) GRAPHICAL SYSTEM FOR DATABASE MARKETING

(71) Applicant: QuickPivot Corporation, Boston, MA (US)

(72) Inventor: Paul Mandeville, Narragansett, RI (US)

(73) Assignee: QUICKPIVOT CORPORATION, Boston, MA (US)

( * ) Notice: Subject to any disclaimer, the term of this patent is extended or adjusted under 35 U.S.C. 154(b) by 717 days.

(21) Appl. No.: 14/661,512

(22) Filed: Mar. 18, 2015

(65) Prior Publication Data

US 2015/0348088 A1     Dec. 3, 2015

Related U.S. Application Data

(60) Provisional application No. 62/003,963, filed on May 28, 2014.

(51) Int. Cl.
| | |
|---|---|
| *G06Q 30/00* | (2012.01) |
| *G06Q 30/02* | (2012.01) |
| *G05B 19/418* | (2006.01) |

(52) U.S. Cl.
CPC ..... *G06Q 30/0243* (2013.01); *G06Q 30/0244* (2013.01)

(58) Field of Classification Search
None
See application file for complete search history.

(56) References Cited

U.S. PATENT DOCUMENTS

| | | | |
|---|---|---|---|
| 6,236,977 B1 | 5/2001 | Verba et al. | |
| 7,281,218 B1 * | 10/2007 | Runge | G06Q 30/02 |
| | | | 715/745 |
| 7,991,800 B2 | 8/2011 | Lawrence et al. | |
| 2003/0041050 A1 * | 2/2003 | Smith | G06Q 30/02 |
| 2012/0232957 A1 | 9/2012 | Hahn et al. | |
| 2014/0244378 A1 * | 8/2014 | Brown | G06Q 30/0269 |
| | | | 705/14.41 |

OTHER PUBLICATIONS

Bennett, Kristin P., et al., On Support Vector Decision Trees for Database Marketing, Rensselaer Polytechnic Institute, R.P.I. Math Report 98-100, Mar. 1998.

* cited by examiner

*Primary Examiner* — Maria V Vanderhorst
(74) *Attorney, Agent, or Firm* — McDonnell Boehnen Hulbert & Berghoff LLP

(57) ABSTRACT

An example method involves a computing device displaying a first action-outcome node corresponding to a first marketing-campaign action, displaying a plurality of outcomes of the first marketing-campaign action, positioned around the first action-outcome node, wherein each outcome corresponds to a potential result of the first marketing-campaign action, displaying a second action-outcome node corresponding to a second marketing-campaign action, displaying a plurality of outcomes of the second marketing-campaign action, positioned around the second action-outcome node, wherein each outcome corresponds to a potential result of the second marketing-campaign action, and displaying a graphical link connecting an outcome of the first action-outcome node to the second action-outcome node.

20 Claims, 6 Drawing Sheets

GRAPHICAL SYSTEM FOR DATABASE MARKETING

CROSS-REFERENCE TO RELATED APPLICATIONS

This application claims priority to U.S. Provisional Patent Application No. 62/003,963 filed May 28, 2014, which is herein incorporated by reference.

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

Database marketing is a technique used to market products or services to consumers. Generally, database marketing makes use of a database of potential consumers to create personalized communications, thereby more effectively marketing specific products or services.

In order to use the database marketing technique, a database marketing campaign may be developed. The campaign strategy may involve generating actions to take during a marketing campaign, such as sending an email or direct mail. In addition, the campaign strategy may involve generating potential outcomes of the actions.

A user of the database marketing technique may want to graphically represent the campaign, for example by showing the actions and outcomes on a decision tree. However, even a relatively simple database marketing campaign may involve five to ten actions, with several outcomes for each action. The number of items on a graphic of this size can reach into the tens and even hundreds of items. Thus, a flow chart can easily become cluttered, and a user may not be able to quickly understand and make use of the information contained in the graphic.

SUMMARY

In a first aspect, an example method involves: a computing device displaying a first action-outcome node corresponding to a first marketing-campaign action; the computing device displaying a plurality of outcomes of the first marketing-campaign action, positioned around the first action-outcome node, wherein each outcome corresponds to a potential result of the first marketing-campaign action; the computing device displaying a second action-outcome node corresponding to a second marketing-campaign action; the computing device displaying a plurality of outcomes of the second marketing-campaign action, positioned around the second action-outcome node, wherein each outcome corresponds to a potential result of the second marketing-campaign action; and the computing device displaying a graphical link connecting an outcome of the first action-outcome node to the second action-outcome node.

In a second aspect, an example method involves a computing device displaying a first action-outcome node corresponding to a first marketing-campaign action, and simultaneously with the display of the first action outcome node, generating computer readable instructions that, when executed by a processor, cause the first marketing campaign action to be carried out; the computing device displaying a plurality of outcomes of the first marketing-campaign action, positioned around the first action-outcome node, wherein each outcome corresponds to a potential result of the first marketing-campaign action; the computing device displaying a second action-outcome node corresponding to a second marketing-campaign action, and simultaneously with the displaying of the second action outcome node, generating computer readable instructions that, when executed by a processor, cause the second marketing campaign action to be carried out; the computing device displaying a plurality of outcomes of the second marketing-campaign action, positioned around the second action-outcome node, wherein each outcome corresponds to a potential result of the second marketing-campaign action; the computing device displaying a graphical link connecting an outcome of the first action-outcome node to the second action-outcome node; and the computing device displaying, on or near a given outcome of the plurality of outcomes of the first marketing-campaign action, data corresponding to the given outcome.

In a third aspect, an example non-transitory computer-readable medium has stored thereon program instructions that when executed cause a computing device to perform a set of acts including: displaying a first action-outcome node corresponding to a first marketing-campaign action; displaying a plurality of outcomes of the first marketing-campaign action, positioned around the first action-outcome node, wherein each outcome corresponds to a potential result of the first marketing-campaign action; displaying a second action-outcome node corresponding to a second marketing-campaign action; displaying a plurality of outcomes of the second marketing-campaign action, positioned around the second action-outcome node, wherein each outcome corresponds to a potential result of the second marketing-campaign action; and displaying a graphical link connecting an outcome of the first action-outcome node to the second action-outcome node.

DETAILED DESCRIPTION

I. Overview

Figure 1:
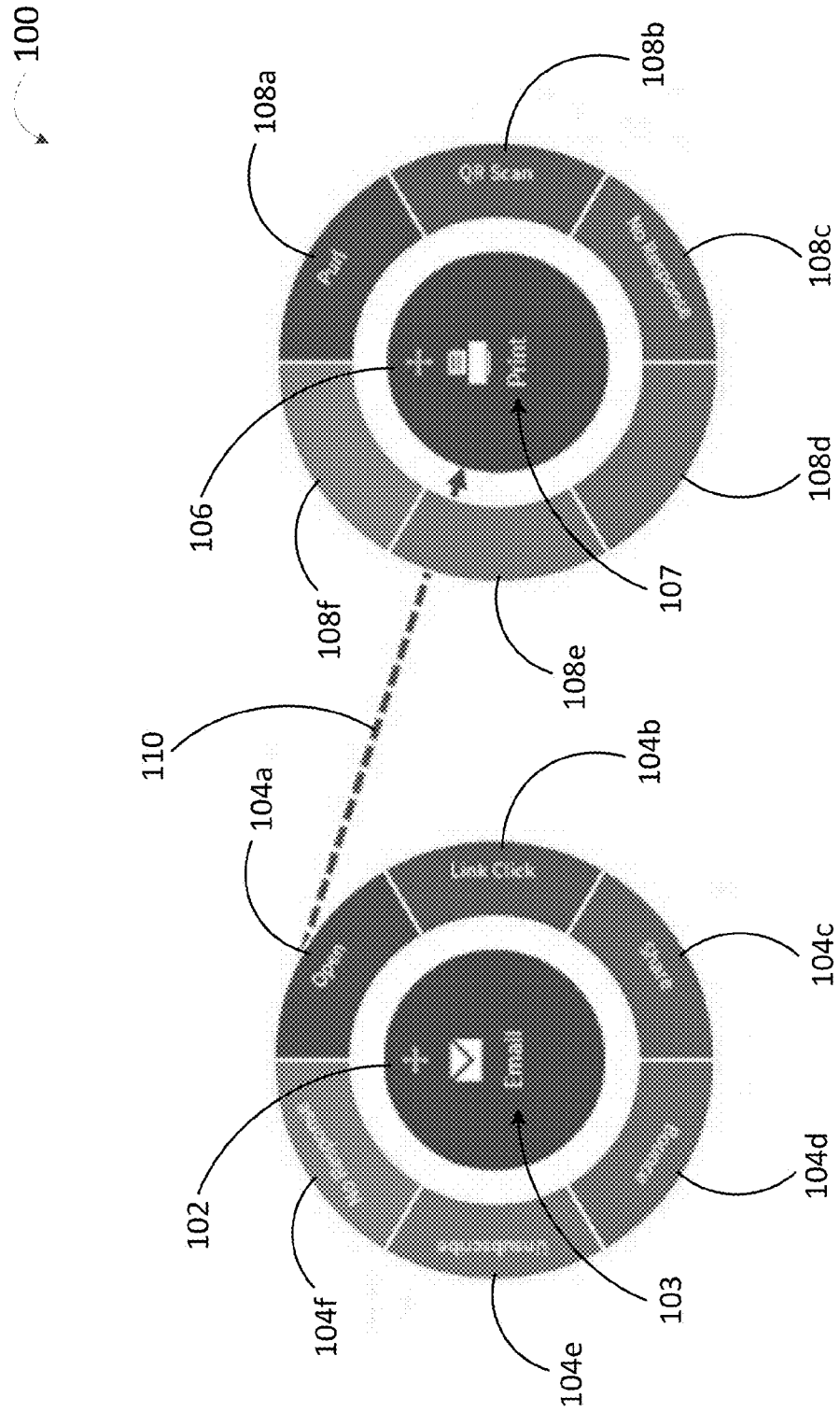
FIG. 1 illustrates an example database-marketing diagram according to the present disclosure.

Various embodiments in the present disclosure relate to managing a database marketing campaign. To begin, a campaign may involve an initial database of people or consumers, which may be called an audience. The campaign may involve carrying out marketing campaign actions directed toward that audience, such as sending an email, for example. After receiving an email, members of the audience may respond in several ways (called "outcomes"), such as by opening the email, clicking on a link contained in the email, sharing the email, or various other possibilities. During the course of a database marketing campaign, the decision to use various marking campaign actions may depend upon the potential outcomes, and whether particular consumers have responded in a certain way to previous actions. For example, a database marketing campaign may involve a strategy where an initial email is sent to all consumers in a given database. The strategy may then involve sending a second email containing a coupon to only those consumers who clicked on a link contained within the initial email.

Ordinarily, a decision tree diagram is used to graphically represent a database marketing campaign, such as the one just described. A decision tree diagram may generally include a number of boxes representing potential actions and outcomes, with a small number of initial actions followed by an ever-expanding set of responses and further actions. For example, a first action may have three possible outcomes, shown by boxes and arrows connecting the action to the outcomes. Each outcome, in turn, may have one or more follow up actions, represented by boxes connected to each of the three outcomes. Each of these follow up actions may in turn have several outcomes, represented by boxes and connecting arrows. Boxes and arrows may be added ad infinitum in this manner until a full representation of the campaign is reached. As a result, a database marketing campaign represented by a decision tree diagram with a few actions and outcomes quickly becomes difficult to view and understand.

To address this problem (and perhaps others), the present disclosure provides example methods and systems that may help provide a database decision tree structure that is easier to view and understand. According to the present disclosure, an example method may involve a computing device displaying (1) a first action-outcome node corresponding to a first marketing-campaign action, (2) a plurality of outcomes of the first marketing-campaign action positioned around the first action-outcome node, wherein each outcome corresponds to a potential result of the first marketing-campaign action, (3) a second action-outcome node corresponding to a second marketing-campaign action, (4) a plurality of outcomes of the second marketing-campaign action positioned around the second action-outcome node, wherein each outcome corresponds to a potential result of the second marketing-campaign action, and (5) a graphical link connecting an outcome of the first action-outcome node to the second action-outcome node. In addition, the method may involve, (6) simultaneously with the display of the first and second action-outcome nodes, generating computer readable instructions that, when executed by a processor, cause the first and second marketing-campaign actions to be carried out. Further, the method may involve the computing device displaying (7) on or near a given outcome of the plurality of outcomes of the first marketing-campaign action, data corresponding to the given outcome.

In one example, when a diagram is generated that includes the database-marketing action "email," the method may involve generating the underlying instructions such that an email may be sent to members of the database.

In addition, some examples may involve generating computer instructions, as described above, simultaneous with the displaying of the first action-outcome node. In this instance, the underlying code to carry out the campaign may be generated simultaneously with displaying the graphic. As such, the diagram and associated instructions may facilitate carrying out the actual campaign actions, and as such is more than a pictorial representation of the diagram.

In another example, the method may include one or more of the numbered actions listed above, wherein displaying the plurality of outcomes of the first marketing campaign action includes displaying the plurality of outcomes of the first marketing campaign action in a generally circular arrangement surrounding the first action outcome node.

In still other examples, the method may involve displaying, on or near a given outcome of the plurality of outcomes of the first marketing-campaign action, data corresponding to the given outcome. The data may be updated in real or near-real time.

In one example, the method may include actions (1)-(5) listed above, wherein the graphical link of step (5) comprises an adjustable link that changes based on the data corresponding to the given outcome. For example, as more of an audience chooses a given response (such as clicking a link in an email), the graphical link connected to that outcome may change in size, color, or some other characteristic.

Other approaches and variations are possible and contemplated within the scope of this disclosure.

II. Example Decision Tree Structure

FIG. 1 illustrates an example database-marketing diagram 100 according to the present disclosure. To develop a database-marketing diagram, a blank surface may be provided onto which a user may drag and drop or place action-outcome node icons. The nodes may be resized, colored, shaped, moved, or otherwise altered on the surface by a user. The user may also place connectors between nodes, and/or between outcome slices and nodes.

A user may also be able to save a diagram, view previous diagrams, view all components of a diagram, and copy or edit diagrams. Further, a user may be able to move diagrams between folders in a system folder structure, and activate or deactivate new or saved database marketing-campaigns. Still further, a user may be able to access and edit new and saved diagrams, standard action-outcome nodes (such as those described in this disclosure), and custom-built action-outcome nodes.

Diagram 100 may include action-outcome nodes 102 and 106, as well as their respective outcomes, 104*a-f* and 108*a-f*. Diagram 100 may also include graphical link 110. The database marketing diagram may be implemented on or by a computing device, such as computing device 300 described in more detail with respect to FIG. 3. In some examples, the database-marketing diagram may be displayed on a display screen of a computing device.

In some examples, the audience for a given action may be selected from a database (not shown) containing potential recipients. Alternatively, the audience for an action may be selected from the outcomes of a previous action. For example, the audience for a second email node may include all recipients of a first email that clicked on an enclosed link. Other audience selection mechanisms are possible as well.

In some embodiments, action-outcome node 102 may correspond to a marketing-campaign action, such as sending an email to a given audience, for example. Node 102 may be displayed as a circular shape, and may include a label 103. Node 102 may be opaque, clear, shaded, bordered by a solid or dashed line, or in any other appropriate form. Label 103 may include a text description indicating the corresponding action (e.g., "email") as well as a graphical icon. Other shapes, labels, marketing-campaign actions, and configurations are possible as well.

The marketing-campaign action corresponding to node 102 may have one or more possible outcomes, such as outcomes 104a-f, for example. For instance, one example set of outcomes, shown in FIG. 1, may include: the recipient opening the email but taking no further action ("open," 104a), the recipient opening the email and clicking on an embedded link ("link click," 104b), the recipient forwarding or otherwise sharing the email ("share," 104c), a failure to deliver the email to the recipient ("bounce," 104d), the recipient unsubscribing from the email list or database ("unsubscribe," 104e), and/or receiving no response from the recipient ("no response," 104f). In other examples, additional outcomes are possible. Outcomes may be used to segment the audience, such that further actions can be taken with respect to members of the audience who meet a certain criteria.

As shown in FIG. 1, outcomes 104a-f may be displayed in a generally circular arrangement surrounding node 102. In some examples, outcomes 104a-f may be referred to as "outcome slices," and may form a ring surrounding node 102, as shown in FIG. 1. In other examples, the outcome slices may form a generally triangular, rectangular, pentagonal, rounded, elliptical, or other orientation surrounding node 102. The outcome slices may be connected to each other, or may be separated (i.e., not forming a continuous object) for example as shown in FIG. 1.

Action-outcome node 106 may include the corresponding marketing-campaign action of sending a printed physical document. This node may include label 107, "Print." In some examples, the audience for node 106 may be selected from one or more outcomes of node 102. For the purpose of explanation, in FIG. 1 the audience for node 106 has been selected as all recipients of the initial email marketing-action that chose to open the email, shown by the "open" (104a) outcome slice and graphical link 110 connecting the outcome 104a and node 106.

In some examples graphical link 110 may be a dashed arrow. In other examples graphical link 110 may be a solid arrow, a dashed or solid line, a block figure, or any other indicative shape or connector. In addition, graphical link 110 may be black and white only, or alternatively may be displayed in color or shaded.

Node 106 may also include example outcomes 108a-f. For instance, outcome 108a may be labeled "Purl" (Personalized Uniform Resource Locator). A Purl allows a user to access a personalized landing page or website specific to the recipient of the Purl. The personalized landing page may allow a marketing-campaign manager to determine whether a recipient has accessed the page or not, such as by keeping track of visitors to the webpage, or creating a web page accessible only to the user, for example. As such, a recipient of a printed document containing a Purl, who then accesses the personalized landing page, may be associated with the "Purl" (108a) outcome slice. It may then be possible for a marketing-campaign manager to use the Purl outcome slice as an audience for a further node (not shown), similar to how the email recipients who chose to "open" the initial email of node 102 may be used as the audience for the print action of node 106.

A second outcome of the "Print" action may be the outcome "QR Scan" 108b. QR codes, or "Quick Response" codes, are 2-dimensional barcodes which can store information, such as a web address, for example. QR codes may be printed on documents, and scanned by a recipient, who may then be able to access a web page or landing page encoded by the QR code. As such, recipients of the printed document from node 106 may scan an included QR code, and thus be associated with the "QR Scan" (108b) outcome slice.

Some embodiments of nodes 102 and/or 106 may also include the outcome "no response" (104f and 108c respectively). Audience members who fail to respond to a marketing-campaign action may be associated with this outcome. In addition, node 106 may include blank outcomes 108d-f, which may allow for expansion or addition of other outcomes not yet included or even contemplated at the time of creation of the diagram.

From a high level view, a database marketing campaign such as the one represented by FIG. 1 may progress as follows: first, an email is sent to an audience selected from a database. The audience may then be grouped based on the responses to the email. In accordance with diagram 100, each recipient who responds by opening the email ("open," 104a) may then be sent a printed, physical document (the action corresponding to node 106), which may contain a Purl and/or a QR code. Finally, recipients of the physical document may be grouped by how they respond to the printed document, such as by accessing a web page or landing page associated with the Purl and/or by scanning the QR code. These groups may then be used as audiences for future action-outcome nodes (not shown), as metrics for campaign analysis (e.g., as statistics to identify which recipients are responding positively to the campaign), or in any other manner relevant to a database marketing campaign.

Figure 2:
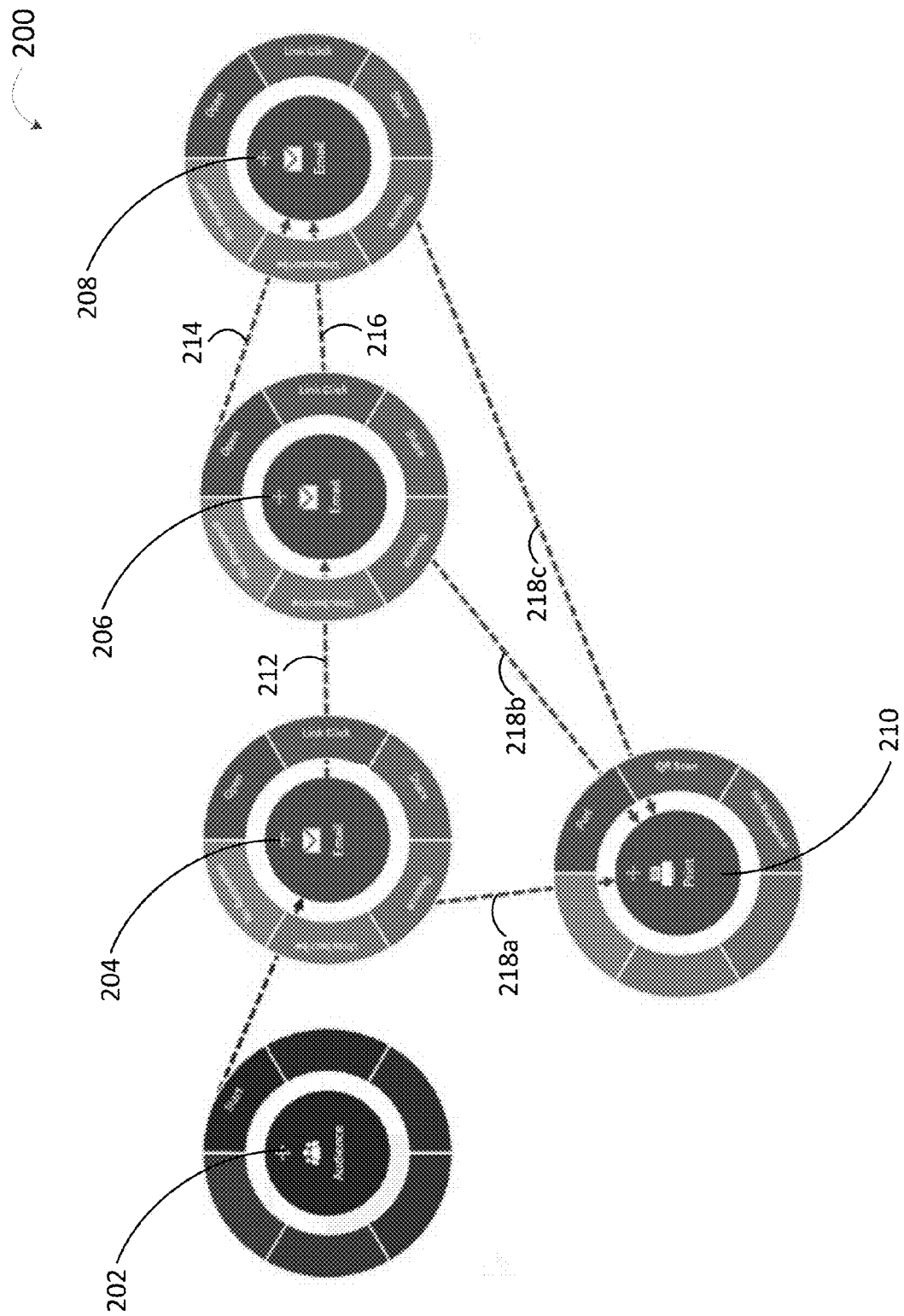
FIG. 2 illustrates an example database-marketing diagram according to the present disclosure.

FIG. 2 illustrates an example database-marketing diagram 200 according to the present disclosure. Diagram 200 may include an audience node 202 and four action-outcome nodes 204-210. Each action-outcome node may include one or more outcome slices, such as those described with reference to FIG. 1. Diagram 200 may also include graphical links between the audience node, the action-outcome nodes, and the various outcome slices. Diagram 200 may be displayed on a display screen of a computing device, such as computing device 300 described later with reference to FIG. 3, for example.

Audience node 202 in diagram 200 may correspond to a selection of recipients a marketing campaign manager wishes to reach with the campaign. The recipients may be selected from a database (not shown). In one example, audience node 202 may correspond to all persons that are currently members of a given club or organization, such as members of a gym, for example. Action-outcome node 204 may correspond to the marketing-action "email," which may include sending an email to each member of the gym.

In some examples, a campaign manager may wish to send a second email to all recipients of the first email, regardless of how they have responded (as opposed to those who merely "open" and/or "share" the email). In this case, graphical link 212 in diagram 200 may be displayed directly connecting node 204 and node 206. Node 206 may correspond to the second email.

The campaign manager may further wish to send a third email, but only to recipients of the second email who either opened or clicked a link included in the second email. In this case, diagram 200 may show graphical links 214 and 216 between the "open" outcome slice of node 206 and node 208, and the "link click" outcome slice of node 206 and node 208, as shown in FIG. 2.

In some examples, a campaign manager may also wish to send a physical document to all members of the audience who failed to receive the one or more email(s) corresponding to nodes 204, 206, and 208. In that case, diagram 200 may display node 210 corresponding to a "print" marketing action. The audience for node 210 may be selected from the outcomes of nodes 204, 206, and 208 corresponding to "bounce." As such, the "bounce" outcomes for each of the three emails may be connected to node 210 via graphical links 218a-c. As a result, each recipient of the first, second, and/or third emails that fails to receive one or more email(s) may be sent a physical document via the "Print" action.

Diagram 200 may represent a database marketing campaign, and may be displayed on a computing device, such as example computing device 300 discussed later in this disclosure. In some examples, the computing device may also generate computer readable instructions that, when executed, carry out the displayed database marketing campaign. For instance, when a user places an action-outcome node onto the diagram, the computing device may generate instructions corresponding to the placed node. The instructions, when executed, may allow the user to add a delay the campaign action, or require a prerequisite event before the action is carried out. In addition, the instructions may allow a user to add notes to or modify characteristics of the node and/or campaign action.

Further, the computing device may generate instructions when a user places one or more graphical links connecting the nodes and/or outcomes. For instance, instructions may be generated when a link is placed between a given first outcome of a first node and a second node. Those instructions, when executed, may cause the action corresponding to the second node to be carried out using an audience that may consist of recipients of the first action who chose the given first outcome.

In one example, a campaign manager may have already drafted emails associated with nodes 204, 206, and 208 of diagram 200. In the case where nodes 204, 206, and 208 are dragged and dropped onto diagram 200, a computing device may generate computer readable instructions that, when executed, send the drafted emails to the intended recipients.

In addition, the computing device may generate computer-readable instructions that, when executed by a processor, allow a marketing-campaign manager to set various parameters for the nodes and outcomes, such as adding a delay for carrying out an action, adding a prerequisite action that must be executed prior to carrying out one or more actions, and running an analysis or quality assurance on the nodes and/or outcomes. In addition, the instructions, when executed, may allow the campaign manager to use a "planning mode, allowing the manager to save a graphic of the diagram as well as a narrative description similar to a program briefing document. Further, the campaign manager may be able to execute, pause, restart, delete, and add or subtract nodes from the diagram at any point. Various other actions are possible as well.

III. Example Computing Device

Figure 3:
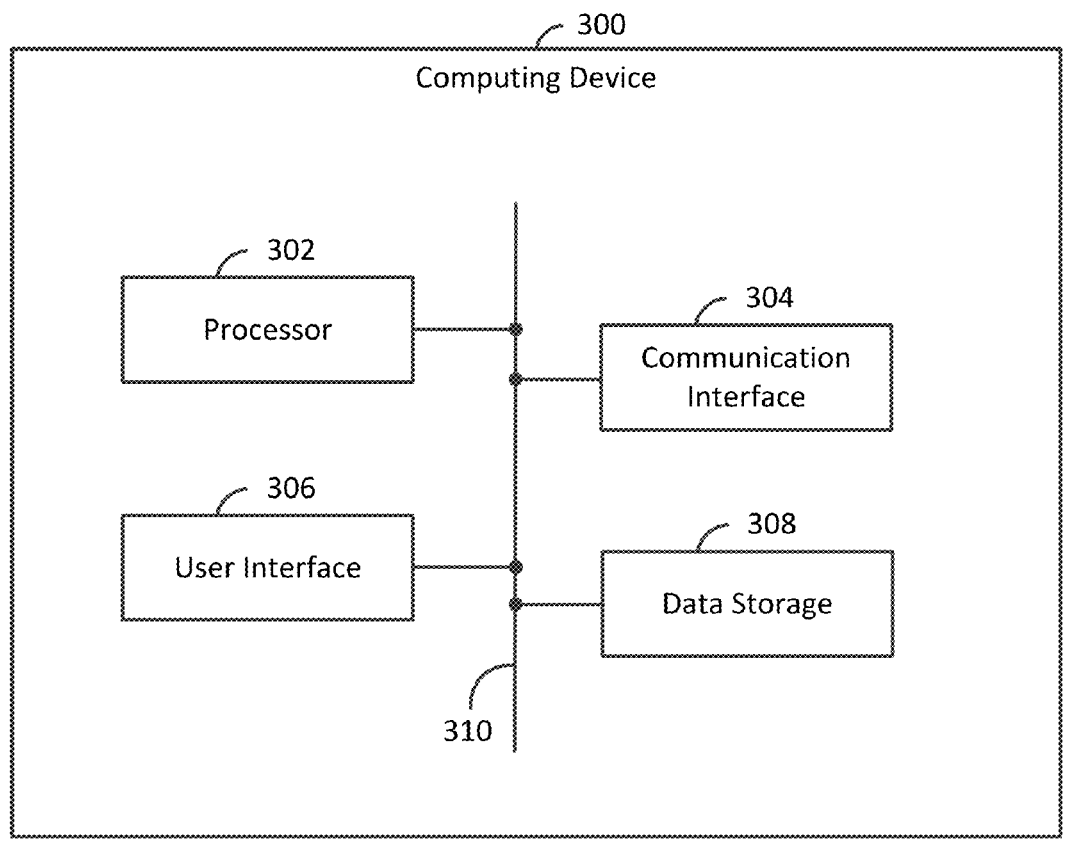
FIG. 3 is a block diagram illustrating an example computing device according to the present disclosure.

FIG. 3 is a block diagram illustrating an example computing device 300 according to the present disclosure. One or more embodiments in this disclosure may be implemented on computing device 300. Computing device 300 may be configured for performing a variety of functions or acts, such as those described in this disclosure (including the accompanying drawings). Computing device 300 may include various components, including for example, a processor 302, a communication interface 304, a user interface 306, and a data storage 308. The components of computing device 300 may be communicatively connected to each other (or other devices or systems) via a system bus, network, or other connection mechanism 310.

Processor 302 may include a general purpose processor (e.g., a microprocessor) and/or a special purpose processor (e.g., a digital signal processor (DSP)). Processor 302 may be configured to execute computer readable instructions, such as those instructions described in this disclosure, for example.

Communication interface 304 may be configured to allow computing device 200 to communicate with one or more devices (or systems) according to one or more protocols. For example, communication interface 304 may be configured to allow emails (e.g., the email from action-outcome node 102, 204, 206, or 208) to be sent to the recipients. In addition, communication interface 304 may be configured to facilitate Short Message Service (SMS) transmission, as well as to allow various other data to be received and transmitted (e.g., data specifying whether or not an email or SMS message recipient has responded, whether a website or landing page has been visited, etc.). In one embodiment, the communication interface 304 may be a wired interface, such as an Ethernet interface. As another example, the communication interface 304 may be a wireless interface, such as a cellular or WI FI interface.

Communication interface 304 may allow communication via a wireless connection that uses, Bluetooth® radio technology, communication protocols described in IEEE 802.11 (including any IEEE 802.11 revisions), cellular technology (such as GSM, CDMA, UMTS, EV-DO, WiMAX, or LTE), or ZigBee® technology, among other possibilities.

User interface 306 may facilitate interaction with a user of computing device 300, if applicable. As such, the user interface 306 may include input components such as a keyboard, a keypad, a mouse, a touch sensitive panel, a microphone, and a camera, and output components such as a display screen (which, for example, may be combined with a touch sensitive panel), a sound speaker, and a haptic feedback system. The display screen may include a liquid crystal display (LCD) screen, cathode ray tube (CRT) display, or organic light-emitting diode (OLED) display, for example.

Data storage 308 may include one or more volatile, non-volatile, removable, and/or non-removable storage components, such as magnetic, optical, or flash storage, and may be integrated in whole or in part with the processor 302. Further, data storage 308 may take the form of a non-transitory computer-readable storage medium, having stored thereon program instructions (e.g., compiled or non-compiled program logic and/or machine code) that, when executed by the processor 302, cause computing device 300 to perform one or more functions or acts, such as those described in this disclosure. Such program instructions may define or be part of a discrete software application that can be executed in response to certain inputs received from the user interface 306, for instance. Data storage 308 may also store other types of information or data, such as those types described throughout this disclosure.

In some examples, various embodiments of this disclosure may be implemented using a software-as-a-service model. As such, the actions and operations herein disclosed may be performed by a server device, which may be accessed by a client device over a wired or wireless network. In some examples, performance of the disclosed actions may be distributed between a client and a server, and in other examples performed solely by a client or server. Both the client and the server may be implemented as computing devices, such as computing device 300 for example.

IV. Example Embodiments

Figure 4:
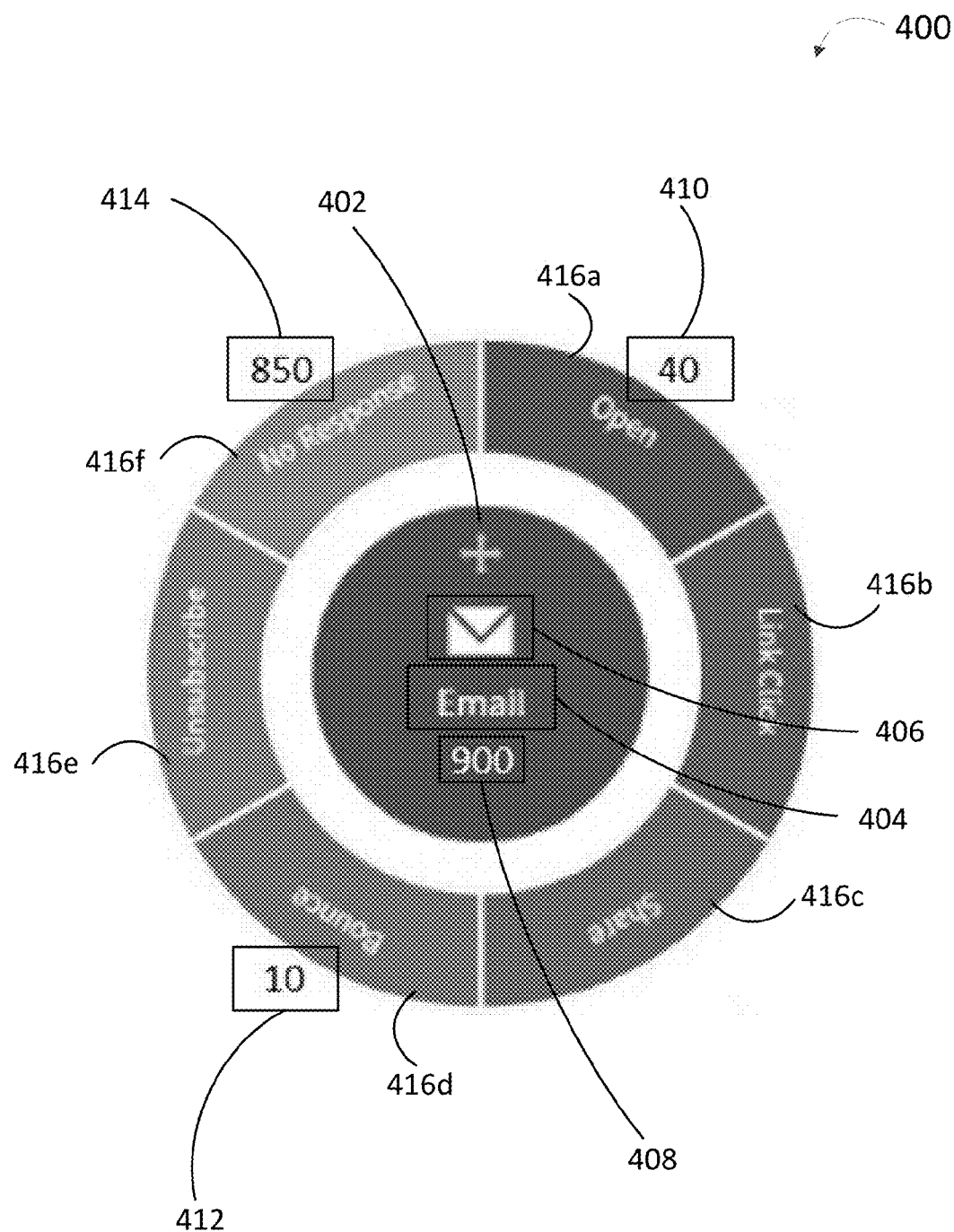
FIG. 4 is a block diagram illustrating an example database-marketing diagram component according to the present disclosure.

FIG. 4 is a block diagram illustrating an example database-marketing diagram component 400 according to the present disclosure. Component 400 may be used in connection with embodiments described in this disclosure, for example the embodiments discussed in connection with FIGS. 1 and 2.

Component 400 may include action-outcome node 402 and a plurality of outcome slices 404a-f, which may be displayed in a circular arrangement surrounding the node 402.

In some examples, node 402 may include a title 404, a graphical icon 406, and a value 408. Title 404 may correspond to a marketing-action, such as sending an email, for example. For illustrative purposes, other example titles and corresponding actions may include, but are not limited to: "SMS" (sending an SMS message), "Landing Page" (presenting a landing page), "Web Page" (presenting a web page), "Web Survey" (sending a web survey), "Web Coupon" (sending a web coupon), "Facebook" (presenting a page from www.facebook.com), "Twitter" (sending a tweet or taking some action via www.twitter.com) and "Print" (sending a physical document). In some examples, action-outcome node 402 may include an as-yet unknown title corresponding to an as-yet unknown action, may be blank, and/or may be customizable. Other titles and actions are possible as well.

Again for illustrative purposes only, example outcomes for the action corresponding to node 402 may include, but are not limited to: opening the email, clicking a link in the email, sharing the email, failing to receive the email, unsubscribing, and no response. Other example outcomes may include selecting a keyword, submitting an online form, printing a coupon, visiting a website or landing page, downloading a file, watching a video, subscribing to content, "liking" or sharing a Facebook page or Facebook content, taking an action on Twitter, or any other measurable outcome. In addition, outcomes may be customizable or blank, such that previously unused or later developed metrics may be used.

Icon 406 displayed on node 402 may correspond to title 404. For example, icon 406 may be an email symbol, a printer symbol, a phone, or any other indicative symbol.

In some examples, node 402 may also include a value 408. Value 408 may correspond to the audience for node 402. For instance, the value "900" in FIG. 4 may indicate that there are 900 total recipients of the email. Value 408 may change based on the relevant audience, for example increasing and/or decreasing based on the outcome of other actions taken during the database-marketing campaign. For instance, where a marketing campaign includes a series of emails (e.g., having three emails as described in FIG. 2), the value associated with node 208 may increase as more recipients open or click on a link in the email associated with node 206 (i.e., as the audience for node 208 increases). In addition, the value associated with node 210 (i.e., Print) may increase as the emails corresponding to nodes 204, 206 and 208 are bounced.

Referring back to FIG. 4, value 408 may be updated in real or near-real time as the marketing campaign progresses. In some examples, information regarding how each recipient has responded or reacted to a given marketing-action may be received and displayed. As such, value 408 may change or be updated in real or near-real time depending on how recipients of the email (or any other action) respond.

In some examples, component 400 may also include data 410, 412, and 414. Data 410 may include information corresponding to outcome 416a, data 412 may correspond to outcome 416d, and data 414 may correspond to outcome 416f. In one example, data 410 corresponds to the number of recipients that opened the email. Data 412 may correspond to the number of people that did not receive the email (i.e., Bounce 416d) and data 414 may correspond to the number of recipients for whom there is no response (i.e., No Response 416f). Outcomes 416b, 416c, and 416e may also have corresponding data (not shown).

In addition, data 410 (as well as data 412 and data 414) may change based on the relevant outcomes. For example, during the course of a marketing-campaign containing node 402, data 410 may increase as more recipients open the email, progressing from "40" to "41" and so on. In some examples data 410 may change when each additional recipient opens the email, while in other examples data 410 may change only when a multiple of 10 or 100 additional recipients open the email. Other variations are possible as well.

Further, data 410 may change in color, size, and/or some other visual way to indicate a change in value, such as when more recipients have opened the email. For instance, data 410 may initially be displayed in a red color, and then change to green when a threshold is reached. In other examples, the relative displayed size of data 410, 412, and 414 may reflect the fraction of total recipients that fall into each respective outcome slice. The relative number of recipients falling into an outcome slice may be referred to as the relative "traffic." In still other examples, the data 410 may be changed dynamically in real or near-real time, to reflect the most recent available information. Other examples are possible as well.

V. Example Operations

Figure 5:
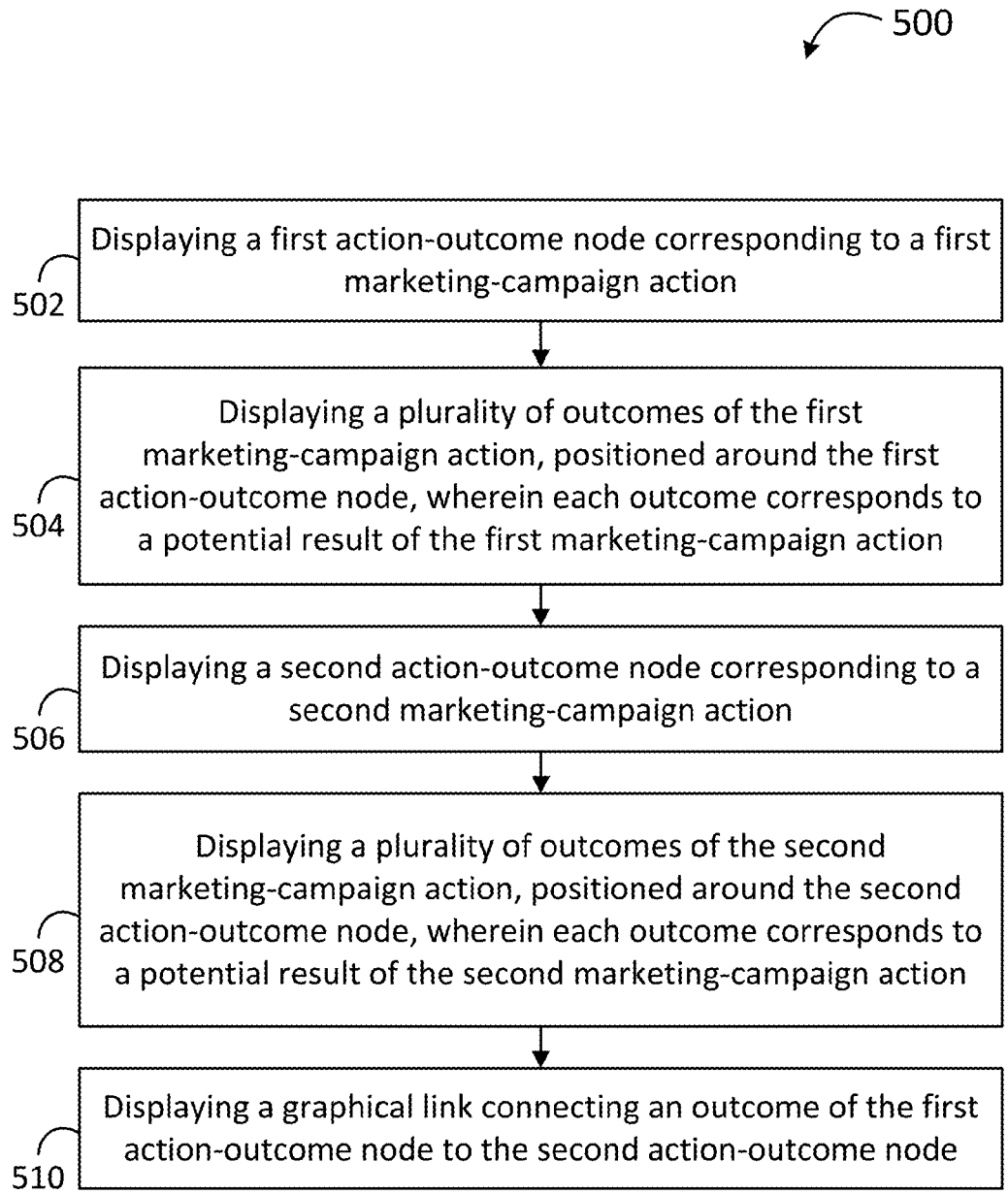
FIG. 5 is a flow chart illustrating an example method according to the present disclosure.

FIG. 5 is a flow chart illustrating an example method 500 according to the present disclosure. At block 502, the method may involve a computing device displaying a first action-outcome node corresponding to a first marketing-campaign action. The first action-outcome node may be displayed in any manner included in this disclosure, including display on a liquid crystal display (LCD) screen, for example. The first marketing-campaign action corresponding to the first action-outcome node may be any action included in this disclosure, for example sending an email, and may be directed to an audience, for example all members of a given club or organization, or a group of potential customers of a business.

The audience may be selected from a database. For example, a computing device, such as computing device 300, may include a database of recipients. In other examples, a database of recipients may be stored in a memory of a remote device or system, and may be accessed via a wired or wireless connection, such as via Ethernet, Wi Fi, or a cellular network, for example.

At block 504, the method 500 may involve the computing device displaying a plurality of outcomes of the first marketing-campaign action, positioned around the first action-outcome node, wherein each outcome corresponds to a potential result of the first marketing-campaign action. The plurality of outcomes may be displayed as outcome slices, displayed in any manner consistent with this disclosure. The outcomes may correspond to various results of the corresponding marketing-campaign action, such as those discussed in connection with FIG. 4, for example. In some examples six outcome slices may be displayed, while in other examples fewer or more outcome slices may be displayed.

At block 506, the method 500 may involve the computing device displaying a second action-outcome node corresponding to a second marketing-campaign action. In some examples, the second action-outcome node may be displayed in a different size or color from the first action-outcome node, allowing a user to more easily identify different nodes. In other examples, all action-outcome nodes corresponding to the same type of action (e.g., email, print, etc. . . . ) may be displayed in the same size or color, such that a user may easily identify all nodes corresponding to the same type of action. In still other examples, each action-outcome node may be sized or colored dynamically to reflect received data corresponding to how many recipients of a given action have responded. These changes in size and color may occur in real or near-real time.

At block 508, the method 500 may involve the computing device displaying a plurality of outcomes of the second marketing-campaign action, positioned around the second action-outcome node, wherein each outcome corresponds to a potential result of the second marketing-campaign action.

At block 510, the method 500 may involve the computing device displaying a graphical link connecting an outcome of the first action-outcome node to the second action-outcome node. In some examples the graphical link may be a static dashed line, arrow, or other shape as discussed earlier. In other examples, the graphical link may change dynamically, and may reflect the relative traffic in the diagram. For example, where a large fraction of recipients have responded to an action in the same manner, a graphical link connecting that outcome slice to a second action-outcome node may be larger than another graphical link, may be a different color, style, or shape, or may have some other characteristic.

Figure 6:
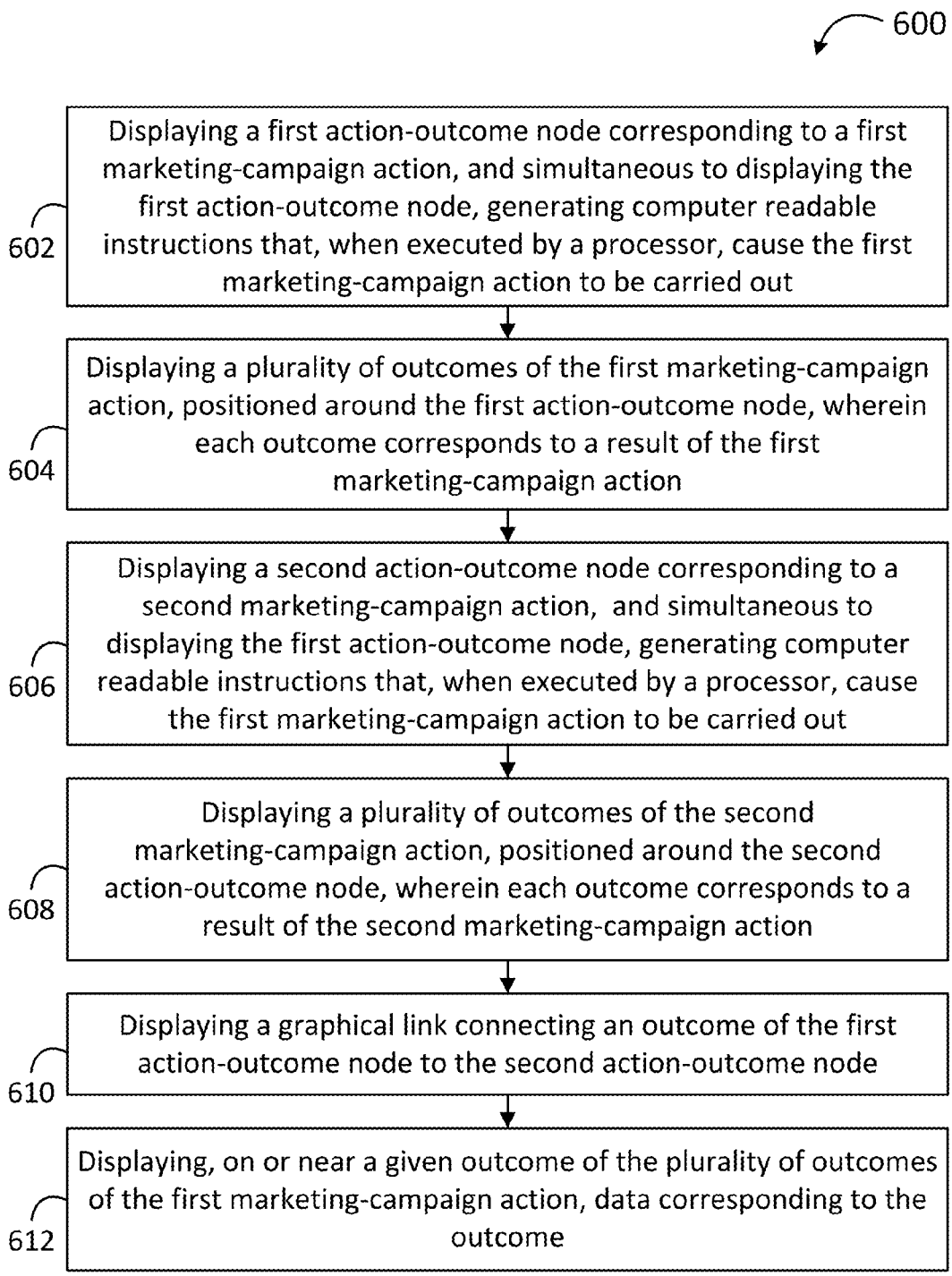
FIG. 6 is a flow chart illustrating an example method according to the present disclosure.

FIG. 6 is a flow chart illustrating an example method 600 according to the present disclosure. One or more blocks shown in FIG. 6 may be similar or identical to the blocks shown and described with reference to FIG. 5. For instance, blocks 604, 608, and 610 correspond to blocks 504, 508, and 510. FIG. 6 includes additional blocks 602, 606, and 612.

At block 602, the method 600 may involve a computing device displaying a first action-outcome node corresponding to a first marketing-campaign action, and simultaneously with the display of the first action-outcome node, generating computer readable instructions that, when executed by a processor, cause the first marketing-campaign action to be carried out.

At block 606, the method 600 may involve the computing device displaying a second action-outcome node corresponding to a second marketing-campaign action, and simultaneously with the display of the first action-outcome node, generating computer readable instructions that, when executed by a processor, cause the first marketing-campaign action to be carried out At block 612, the method 600 may involve the computing device displaying, on or near a given outcome of the plurality of outcomes of the first marketing-campaign action, data corresponding to the given outcome. In some examples, the data may be displayed entirely within, partially on top of, or near a corresponding outcome slice. The data may correspond to the number of recipients corresponding to the outcome slice, such as the number of email recipients who opened the email, for example. In other examples, the data may correspond to the relative number of recipients categorized by their responses. In addition, in some examples the data may include a number. In other examples, the data may include text, an icon, or another visual indication. Other examples are possible as well.

VI. Example Variations

In some examples, a displayed decision tree diagram may include active or "smart" elements. For example, an action-outcome node may be displayed and may include program instructions that when executed by a processor allow the action corresponding to the node to be carried out. As another example, a node may include program instructions that allow an analysis to be run, which may indicate various metrics of the marketing campaign. In still other examples, a node may include instructions that when executed by a processor allow the corresponding action to be delayed, be carried out on a recurring basis, or be carried out only upon some other action being taken. Other variations are possible as well.

While one or more acts have been described as being performed by certain devices, systems, or entities (e.g., computing device 300), the acts may be performed by any appropriate device, system, or entity. Furthermore, the devices and systems need not be discrete entities. Some or all of the devices or systems may be combined in a single device.

In addition, the acts described herein need not be performed in the disclosed order, although in some examples and order may be preferred. Also, not all acts need to be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the invention on its broader aspects as set forth in the following claims.

What is claimed is:

1. A method for implementing a graphical user interface representing a decision tree diagram on a display screen of a computing device, the method comprising:

displaying, by the computing device on the display screen, a first action-outcome node corresponding to a first marketing-campaign action of the decision tree diagram, wherein the first action-outcome node is displayed as a first graphical icon;

displaying, by the computing device on the display screen, a plurality of first outcomes of the first marketing-campaign action by displaying a plurality of first-outcome graphical icons surrounding a border of the first graphical icon, wherein each first outcome corresponds to a potential direct result of the first marketing-campaign action, wherein each first-outcome graphical icon represents a respective one of the plurality of first outcomes;

displaying, by the computing device on the display screen, a second action-outcome node corresponding to a second marketing-campaign action of the decision tree diagram, wherein the second action-outcome node is displayed as a second graphical icon;

displaying, by the computing device on the display screen, a plurality of second outcomes of the second marketing-campaign action by displaying a plurality of second-outcome graphical icons surrounding a border of the second graphical icon, wherein each second outcome corresponds to a potential direct result of the second marketing-campaign action, wherein each second-outcome graphical icon represents a respective one of the plurality of second outcomes; and displaying, by the computing device on the display screen, a graphical link connecting one first-outcome graphical icon of the plurality of first-outcome graphical icons to the second graphical icon, wherein the graphical link indicates that the second marketing-campaign action is carried out in response to the first outcome, which is represented by the one first-outcome graphical icon, occurring as a result of the first marketing-campaign action.

2. The method of claim 1, further comprising:
generating computer instructions that when executed by a processor cause the first marketing-campaign action to be carried out.

3. The method of claim 2, wherein generating computer instructions that when executed by the processor cause the first marketing-campaign action to be carried out occurs simultaneously with the displaying of the first action-outcome node.

4. The method of claim 1, wherein displaying the plurality of first outcomes of the first marketing-campaign action comprises:
displaying the plurality of first outcomes of the first marketing-campaign action in a generally circular arrangement surrounding the first action-outcome node.

5. The method of claim 1, further comprising:
the computing device displaying, on or near a given first outcome of the plurality of first outcomes of the first marketing-campaign action, data corresponding to the given first outcome.

6. The method of claim 5, further comprising updating and displaying the data corresponding to the given first outcome in real or near-real time.

7. The method of claim 6, wherein the graphical link comprises an adjustable link that changes in appearance based on the data corresponding to the given first outcome, and the method further comprises:
responsive to updating the data, changing the appearance of the adjustable link on the display screen.

8. The method of claim 1, wherein the first marketing-campaign action comprises sending an email.

9. The method of claim 8, wherein the plurality of first outcomes of the first marketing-campaign action comprises: opening an email, clicking on a link in the email, and no response to the email.

10. The method of claim 1, wherein displaying the plurality of first-outcome graphical icons surrounding the border of the first graphical icon comprises displaying each first-outcome graphical icon as a respective slice of a ring surrounding the border of the first graphical icon.

11. The method of claim 10, wherein displaying the plurality of first-outcome graphical icons surrounding the border of the first graphical icon comprises displaying the plurality of first-outcome graphical icons without a graphical link connecting the plurality of first-outcome graphical icons and the first graphical icon.

12. A method for programming a computing device to perform a plurality of actions, the method comprising:
receiving, via a user interface of the computing device, a first input selecting a first graphical icon representing a first marketing-campaign action,
responsive to receiving the first input selecting the first marketing-campaign action, the computing device simultaneously: (i) displaying, on a display screen of the computing device, a first action-outcome node corresponding to the first marketing-campaign action, and (ii) generating first computer readable instructions that, when executed by a processor, cause the first marketing-campaign action to be carried out;

displaying, by the computing device on the display screen, a plurality of first outcomes of the first marketing-campaign action by displaying a plurality of first-outcome graphical icons surrounding a border of the first graphical icon, wherein each first outcome corresponds to a potential direct result of the first marketing-campaign action, wherein each first-outcome graphical icon represents a respective one of the plurality of first outcomes;

receiving, via the user interface of the computing device, a second input selecting a second graphical icon representing a second marketing-campaign action, responsive to receiving the second input selecting the second marketing-campaign action, the computing device simultaneously: (i) displaying, on the display screen, a second action-outcome node corresponding to the second marketing-campaign action, and (ii) generating second computer readable instructions that, when executed by the processor, cause the second marketing-campaign action to be carried out;

displaying, by the computing device on the display screen, a plurality of second outcomes of the second marketing-campaign action by displaying a plurality of second-outcome graphical icons surrounding a border of the second graphical icon, wherein each second outcome corresponds to a potential direct result of the second marketing-campaign action, wherein each second-outcome graphical icon represents a respective one of the plurality of second outcomes;

receiving, via the user interface of the computing device, a third input relating to a selected one of the plurality of first-outcome graphical icons and the second graphical icon; and responsive, to receiving the third input, the computing device simultaneously: (i) displaying a graphical link connecting the selected one of the plurality of first-outcome graphical icons and the second graphical icon, and (ii) generating third computer readable instructions that, when executed by the processor, cause the processor to carry out the second marketing-campaign action in response to the first outcome, which is represented by the selected one of the plurality of first-outcome graphical icons, occurring as a result of the first marketing-campaign action.

13. The method of claim 12, wherein displaying the plurality of first outcomes of the first marketing-campaign action comprises:
displaying the plurality of first outcomes of the first marketing-campaign action in a generally circular arrangement surrounding the first action-outcome node.

14. The method of claim 12, wherein the first marketing-campaign action comprises sending an email.

15. The method of claim 12, wherein the plurality of first outcomes of the first marketing-campaign action comprises: opening an email, clicking on a link in the email, and no response to the email.

16. The method of claim 12, further comprising displaying, on or near a given first outcome of the plurality of first outcomes of the first marketing-campaign action, data corresponding to the given first outcome.

17. The method of claim 16, further comprising updating and displaying the data corresponding to the given first outcome in real or near-real time.

18. The method of claim 17, wherein the graphical link comprises an adjustable link that changes in appearance based on the data corresponding to the given first outcome, and the method further comprises:
   responsive to updating the data, changing the appearance of the adjustable link on the display screen.

19. The method of claim 12, wherein displaying the plurality of first-outcome graphical icons surrounding the border of the first graphical icon comprises displaying each first-outcome graphical icon as a respective slice of a ring surrounding the border of the first graphical icon.

20. The method of claim 12, wherein receiving, via the user interface of the computing device, the first input comprises receiving an indication that the first graphical icon was dragged and dropped on the display screen.

* * * * *